United States Patent
Parvataneni et al.

(10) Patent No.: US 11,968,566 B2
(45) Date of Patent: Apr. 23, 2024

(54) SYSTEMS AND METHODS FOR INTER-ENTITY SYSTEM CONFIGURATION MANAGEMENT USING DISTRIBUTED LEDGER SYSTEM

(71) Applicant: Verizon Patent and Licensing Inc., Basking Ridge, NJ (US)

(72) Inventors: Raghuram Parvataneni, Plano, TX (US); John Patrick Hickey, III, Metuchen, NJ (US); Syed Rehman, Monmouth Junction, NJ (US); Anil K. Guntupalli, Irving, TX (US); Mahesh Chapalamadugu, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 7 days.

(21) Appl. No.: 17/662,497

(22) Filed: May 9, 2022

(65) Prior Publication Data
US 2023/0362737 A1 Nov. 9, 2023

(51) Int. Cl.
| | |
|---|---|
| *H04L 41/5051* | (2022.01) |
| *G06F 16/27* | (2019.01) |
| *H04L 41/50* | (2022.01) |
| *H04W 28/24* | (2009.01) |

(52) U.S. Cl.
CPC ............ *H04W 28/24* (2013.01); *G06F 16/27* (2019.01); *H04L 41/5051* (2013.01); *H04L 41/5096* (2013.01)

(58) Field of Classification Search
CPC .... H04W 28/24; G06F 16/27; H04L 41/5051; H04L 41/5096
See application file for complete search history.

(56) References Cited

U.S. PATENT DOCUMENTS

| | | | |
|---|---|---|---|
| 11,119,786 B2* | 9/2021 | Ni | .......... G06F 9/3851 |
| 11,304,074 B1* | 4/2022 | Bellamkonda | ........ H04W 88/06 |
| 11,657,461 B2* | 5/2023 | Cella | .................... G06Q 30/018 |
| | | | 705/38 |
| 2015/0036489 A1* | 2/2015 | Rajadurai | ........... H04L 47/2475 |
| | | | 370/230 |
| 2015/0365275 A1* | 12/2015 | Iliev | .................... H04L 41/5096 |
| | | | 709/220 |
| 2017/0070543 A1* | 3/2017 | Balasubramanian | ........................ |
| | | | H04W 8/082 |
| 2017/0317894 A1* | 11/2017 | Dao | .................... H04L 41/5009 |

(Continued)

*Primary Examiner* — David P Zarka
*Assistant Examiner* — Wuji Chen

(57) ABSTRACT

A system described herein may maintain records, in a distributed ledger, that include parameters (e.g., Quality of Service ("QoS") parameters and/or Multi-Access/Mobile Edge Computing ("MEC") device management parameters) that are associated with particular applications and/or MEC operator systems. The system may identify a particular record, from the distributed ledger, that is associated with a particular MEC operator system. The particular record may indicate a first set of MEC configuration parameters implemented by the MEC device operator system, and one or more triggers based on which the first set of MEC configuration parameters were implemented by the MEC device operator system. The system may record a set of modified application parameters, that are generated based on the identified first set of MEC configuration parameters and the one or more triggers, to the distributed ledger.

20 Claims, 9 Drawing Sheets

(56) References Cited

U.S. PATENT DOCUMENTS

| | | | |
|---|---|---|---|
| 2019/0104017 A1* | 4/2019 | Khosrowpour | H04L 41/0896 |
| 2019/0215731 A1* | 7/2019 | Qiao | H04W 24/10 |
| 2020/0195495 A1* | 6/2020 | Parker | H04L 41/082 |
| 2020/0294139 A1* | 9/2020 | Cella | G06Q 20/405 |
| 2020/0374740 A1* | 11/2020 | So | H04L 41/16 |
| 2020/0374974 A1* | 11/2020 | Sun | H04L 41/20 |
| 2021/0076250 A1* | 3/2021 | Wang | H04W 28/0221 |
| 2021/0144517 A1* | 5/2021 | Guim Bernat | H04W 12/04 |
| 2021/0360714 A1* | 11/2021 | Zhang | H04L 41/5051 |
| 2021/0368393 A1* | 11/2021 | Kotecha | H04B 17/3913 |
| 2022/0006857 A1* | 1/2022 | Sun | H04L 67/1031 |
| 2022/0014973 A1* | 1/2022 | Perras | H04L 1/0017 |
| 2022/0109622 A1* | 4/2022 | Yeh | H04L 69/40 |
| 2022/0124560 A1* | 4/2022 | Yeh | H04W 28/26 |
| 2022/0138081 A1* | 5/2022 | Varma | G06F 11/3684 |
| | | | 717/124 |
| 2022/0141192 A1* | 5/2022 | Silveira | H04L 63/20 |
| | | | 726/15 |
| 2022/0167236 A1* | 5/2022 | Melodia | H04W 28/0236 |
| 2022/0201556 A1* | 6/2022 | Yang | H04W 48/18 |
| 2022/0272151 A1* | 8/2022 | Umanesan | H04L 47/783 |
| 2022/0353801 A1* | 11/2022 | Misra | H04W 48/18 |
| 2022/0417799 A1* | 12/2022 | Schnitzler | H04L 41/5003 |
| 2023/0074288 A1* | 3/2023 | Filippou | H04W 28/0236 |
| 2023/0127913 A1* | 4/2023 | Khan | H04L 9/32 |
| | | | 380/28 |

* cited by examiner

US 11,968,566 B2

SYSTEMS AND METHODS FOR INTER-ENTITY SYSTEM CONFIGURATION MANAGEMENT USING DISTRIBUTED LEDGER SYSTEM

BACKGROUND

Wireless networks may provide wireless connectivity to User Equipment ("UEs") such as mobile phones, tablets, Internet of Things ("IoT") devices, or other types of devices. Wireless networks may deploy edge computing systems at various geographical locations in order to provide lower latency service to UEs that are located in or near such geographical locations. Different wireless network operators may provide different sets of edge computing systems. Distributed ledgers, such as blockchains, provide for the decentralized and secure storage of data. Distributed ledgers may further provide for the immutability of recorded data, as data may not be altered once recorded to a distributed ledger.

DETAILED DESCRIPTION OF EXAMPLE EMBODIMENTS

Figure 1:
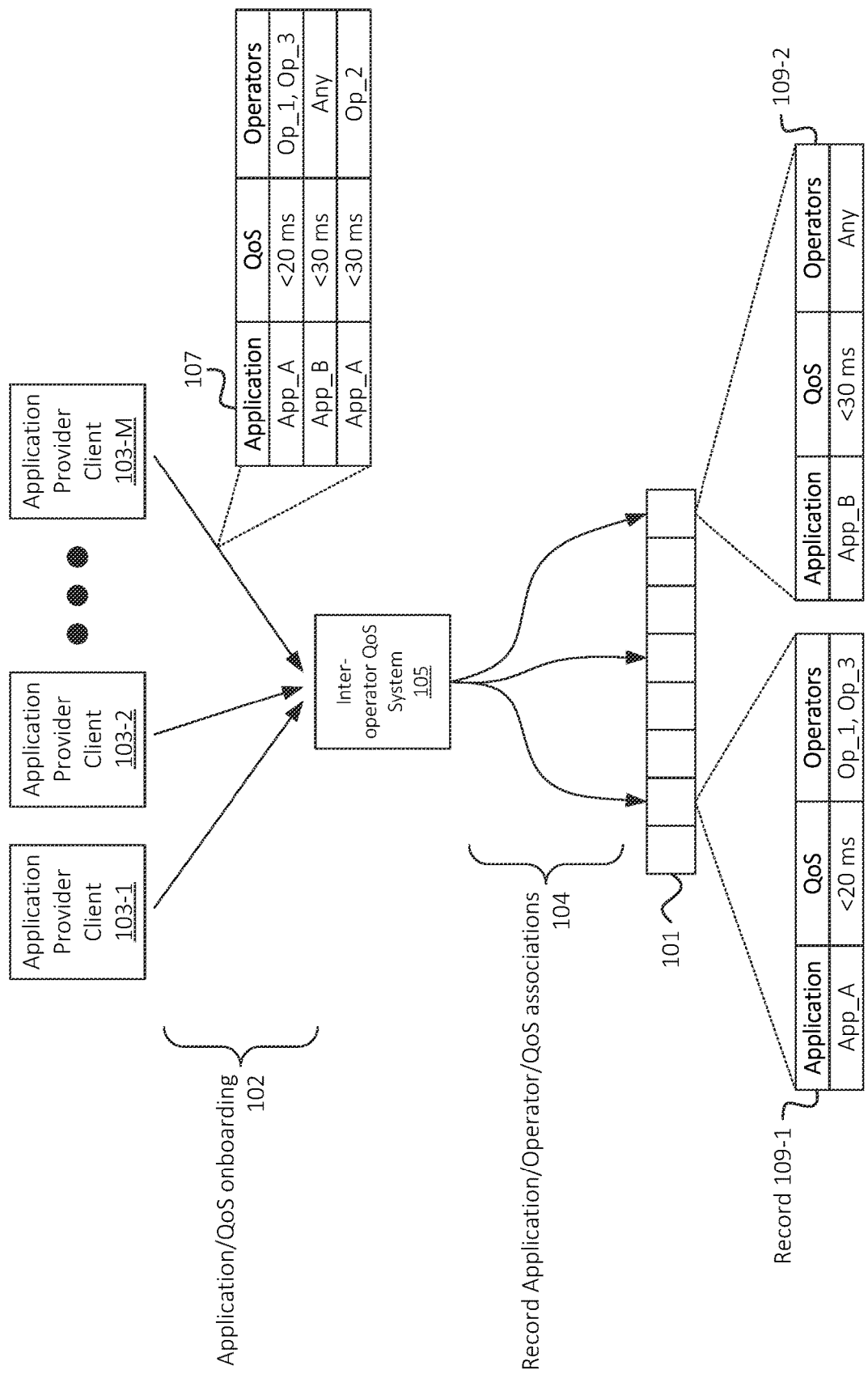
FIG. 1 illustrates an example recording of parameters, as provided by one or more application providers, to a distributed ledger system, in accordance with some embodiments.

The following detailed description refers to the accompanying drawings. The same reference numbers in different drawings may identify the same or similar elements.

Embodiments described herein provide for the use of distributed ledgers, such as blockchains, to provide for the management of configuration parameters or other parameters of systems that are associated with (e.g., operated by, owned by, configured by, etc.) different entities. Examples of such systems, as discussed herein, may include Multi-Access/Mobile Edge Computing ("MEC") operator systems that manage the configuration of MECs or other edge devices (referred to herein simply as "MECs" for the sake of brevity) that are deployed in geographically distinct regions. MECs or other edge devices may, for example, be co-located with base stations of a radio access network ("RAN") and/or may otherwise be communicatively coupled to a RAN. A particular MEC operator system may be included in, may be communicatively coupled to, and/or may otherwise be associated with a wireless network provider that operates, provides, etc. a particular RAN.

MECs may accordingly provide services, such as traffic processing services, gaming services, augmented reality services, autonomous driving assistance services, etc. to User Equipment ("UEs"), such as mobile phones, tablets, Internet of Things ("IoT") devices, etc. without the need for traffic associated with such UEs to be provided to or from a wireless network core or some other external network.

Particular applications, that are associated with services provided via MECs, may be associated with different Service Level Agreements ("SLAs"), QoS thresholds, latency thresholds, or the like (referred to herein simply as "QoS parameters" for the sake of brevity). For example, a gaming application may be associated with a maximum latency threshold, an augmented reality application may be associated with a minimum throughput threshold, etc.

Further, different MEC operator systems may have different policies, capabilities, amounts of resources, etc., such that different MEC operator systems may have different criteria, considerations, etc. for which different MEC management parameters may be appropriate or optimal for different MEC operator systems. MEC management parameters may relate to, for example, "scale up" operations relating to allocating additional resources at a given MEC (e.g., conditions, criteria, etc. based on which to perform scale up operations), "lifecycle" operations relating to deallocating or reducing the allocation of resources at a given MEC (e.g., conditions, criteria, etc. based on which to perform lifecycle operations), or other suitable management operations.

As such, different MEC operator systems may implement MEC configurations differently in order to optimize or balance between QoS parameters associated with applications provided by MECs of the MEC operator systems, as well as MEC management parameters associated with such MEC operator systems. In situations where multiple different MEC operator systems are associated with different QoS parameters, MEC management parameters, etc., a given application provider may have difficulties in ascertaining the feasibility of a given MEC operator system in meeting particular QoS parameters, and/or whether particular QoS parameters are able to be provided by a MEC operator system. For example, in instances where numerous MEC operator systems provide services associated with a given application, the application provider may have difficulty in establishing and/or maintaining numerous communication pathways with the MEC operator systems.

Embodiments discussed herein may provide for a single entity (e.g., an application provider associated with an application), to specify QoS parameters for an application, and for multiple entities (e.g., multiple MEC operator systems and/or other entities) to determine the QoS parameters for the application and implement one or more MEC configurations in order to meet the QoS parameters. Further, embodiments herein provide for the MEC operator systems to indicate particular actions that were taken in order to meet QoS parameters, such as the modifying or implementing of MEC configuration parameters, as well as the criteria or triggers for performing such actions (e.g., where the criteria or triggers may include an indication of particular QoS parameters, events such as the predicted or actual movement of UEs into a wireless network associated with a given MEC operator system, etc.). In some embodiments, the application provider may receive the indication of the actions taken by particular MEC operator systems as well as the criteria or triggers for performing the actions, and may refine QoS parameters for the application based on the actions taken by particular MEC operator systems and/or the criteria or triggers. The application provider may, for example, utilize artificial intelligence/machine learning ("AI/ML") techniques or other suitable techniques to refine such QoS parameters on a per-MEC operator system basis, a per-application basis, and/or some other suitable basis. The application provider may specify the updated QoS parameters, which may be identified and implemented by MEC operator systems.

Embodiments described herein utilize distributed ledger techniques, such as blockchain techniques, in order to facilitate the specifying of QoS parameters (e.g., including updated QoS parameters determined by an application provider) and the determination by MEC operator systems of particular QoS parameters that are applicable to particular MEC operator systems. In this manner, the same application provider may be able to provide QoS parameters to multiple different MEC operator systems in a simplified manner (e.g., without requiring direct communications between the application provider and the MEC operator systems), such as by recording the QoS parameters to a distributed ledger. Further, the MEC operator systems may record the actions taken by the MEC operator systems and/or the criteria or triggers for implementing such actions to one or more distributed ledgers, based on which the application provider may modify QoS parameters as noted above (e.g., without necessitating direct communication pathways between multiple MEC operator systems and the application provider).

As shown in FIG. 1, distributed ledger 101 (also referred to herein simply as "ledger 101") may be used to record QoS parameters provided by one or more application provider clients 103. Ledger 101 may be, for example, maintained by a set of nodes, validators, or other suitable entities. In some embodiments, ledger 101 may be or may include a permissioned ledger, in which certain nodes or other entities have certain permissions to access ledger 101, such as read, write, or both. In this manner, nodes, clients, and/or other entities that do not have permissions to access ledger 101 may be unable to access ledger 101 (e.g., requests to read or write to ledger 101 may be denied by nodes that maintain ledger 101).

In some embodiments, particular records recorded to ledger 101 may be associated with particular sets of permissions. For example, a client or other authorized entity (such as application provider client 103) that provides data to be recorded to ledger 101 may specify one or more other entities, such as other nodes, clients, wallets, etc. that are authorized to access (e.g., read) such data. Such permissions may be specified by parameters, metadata, etc. of the data to be recorded to ledger 101. The permissions may indicate an address, group, category, label, or other suitable identifier of entities that are authorized to access the data. The specified address may be, for example, an address of a node, client, wallet, or other entity associated with ledger 101. In some embodiments, ledger 101 may include a mapping between such addresses and groups, categories, labels, etc. Additionally, or alternatively, a ledger framework (e.g., the Hyperledger framework) or other type of ledger management system or ledger framework associated with ledger 101 may maintain such mapping. In this manner, some nodes that are authorized to access ledger 101 may not be able to access particular data recorded to ledger 101, while other nodes that are authorized to access ledger 101 may be able to access the particular data.

In some embodiments, application provider clients 103 and/or other entities may provide data, to be recorded to ledger 101, to Inter-operator QoS System ("IQS") 105. In some embodiments, IQS 105 may be implemented by, may include, and/or may be communicatively coupled to a decentralized application ("dApp") or other type of entity that is authorized to (e.g., via a permission establishment procedure) or otherwise capable of recording data to ledger 101, reading data from ledger 101, interacting with smart contracts deployed to ledger 101, and/or performing other operations discussed herein.

Application provider clients 103 may be associated with one or more entities that provide one or more different applications that are executable or otherwise deployable at one or more MECs. In some embodiments, application provider clients 103 may not have access to directly write to ledger 101, thus preserving the security of ledger 101. In some embodiments, application provider clients 103 may be or may include entities with an address, set of keys, or other information associated with ledger 101, and may accordingly use such mechanisms to "sign" interactions with IQS 105.

Application provider clients 103 may, for example, provide (at 102) application and/or QoS onboarding information. Data structure 107 reflects an example of application and/or QoS onboarding information that may be provided by a particular application provider client 103 and/or by multiple application provider clients 103. As shown, for example, data structure 107 may include QoS parameters for two example applications, "App_A" and "App_B." In some embodiments, the "Application" field of data structure 107 may include a name, identifier, or other indicator of a particular application, such as an application that is executable or deployable at one or more MECs. Such application may include a gaming application, an augmented reality application, a video processing application, or other MEC-deployable application. The "QoS" field may indicate one or more QoS thresholds, SLAs, minimum performance metrics, or other suitable QoS parameters. In the examples discussed herein, the QoS parameters are specified in terms of maximum latency. In practice, the QoS parameters may be specified in some other suitable manner (e.g., minimum throughput, maximum processing time, etc.).

Further, while examples are provided herein in the context of QoS parameters, application provider clients 103 may provide other types of parameters, such as MEC management parameters, as noted above. The MEC management parameters may include scale up parameters, which may indicate thresholds, conditions, criteria, etc. based on which MEC resources should be increased for a given application and/or MEC operator system. For example, the scale up parameters may indicate that resources of a particular MEC, allocated for providing a particular application, should be increased when a predicted or actual quantity of UEs that receive services associated with the particular application from the particular MEC exceeds a particular threshold quantity.

As another example, the MEC management parameters may include lifecycle parameters, which may indicate thresholds, conditions, criteria, etc. based on which MEC resources should be reduced for a given application and/or MEC operator system. For example, the lifecycle parameters may indicate that resources of a particular MEC, allocated for providing a particular application, should be reduced when a predicted or actual quantity of UEs that receive services associated with the particular application from the particular MEC falls below a particular threshold quantity.

The "Operators" field may specify particular MEC operator systems, such as by a name or other identifier of such MEC operator systems (e.g., represented as "Op_1," "Op_2," and "Op_3" in the figure). Additionally, or alternatively, the "Operators" field may include address, identifiers, etc. of MEC operator nodes 201 with which respective MEC operator systems are associated. The "Operators" field may, in some embodiments, indicate MEC operator systems with which a given set of QoS parameters, MEC management parameters, and/or other parameters for a given application are associated. For example, App_A may be associated with a maximum latency of 20 milliseconds ("ms") for MECs provided by MEC operator systems Op_1 and Op_3, and may be associated with a maximum latency of 30 ms for MECs provided by MEC operator system Op_2. The different QoS parameters for the same application but for different providers may be based on different agreements, metrics, criteria, or other factors between particular application providers and particular MEC operator systems.

While an example of data structure 107 is discussed herein, in practice, data structure 107 may include additional, fewer, or different information items. For example, in some embodiments, in lieu of an "Operators" field, portions of data structure 107 may be encrypted using a public key associated with a particular MEC operator system with which a given record is associated (e.g., the information indicating the 30 ms maximum latency for App_A may be encrypted using a public key associated with MEC operator system Op_2). In this manner, MEC operator systems with which respective application and/or QoS parameters are associated may be able to access such information, while MEC operator systems with which respective application and/or QoS parameters are not associated may be unable to access such information. Further, as discussed above, some portions of data structure 107 may be provided by one application provider client 103, while another portion of data structure 107 may be provided by another application provider client 103. Additionally, or alternatively, different application provider clients 103 may provide different instances of data structure 107.

IQS 105 may record (at 104) the associations of particular applications to QoS parameters and/or MEC providers (e.g., as reflected in example data structure 107) to ledger 101. For example, IQS 105 may interact with one or more smart contracts deployed to ledger 101 and/or may otherwise cause one or more records to be generated on ledger 101 with some or all of the data shown in data structure 107. For example, IQS 105 may cause records 109-1, 109-2, and/or other records to be written to ledger 101 based on the provided (at 102) information. Record 109-1, for example, may include the above-discussed indication that App_A is associated with a maximum latency of 20 ms when served by MEC operator systems Op_1 and Op_3. Record 109-2 may include an indication that App_B is associated with a maximum latency of 30 ms when served by MECs associated with any MEC operator system. One or more other records 109 may include indications of QoS and/or operator information associated with other applications, including an indication that App_A is associated with a maximum latency of 30 ms when served by MEC operator system Op_2.

As discussed above, in embodiments where the application and/or QoS associations are encrypted (e.g., using a public key associated with a given MEC operator system), a given record 109 may not explicitly include an indication of a particular MEC operator system. In such embodiments, record 109-2 may be unencrypted, as the application and/or QoS association indicated therein is indicated as accessible by any MEC operator system that is authorized to access ledger 101.

Figure 2:
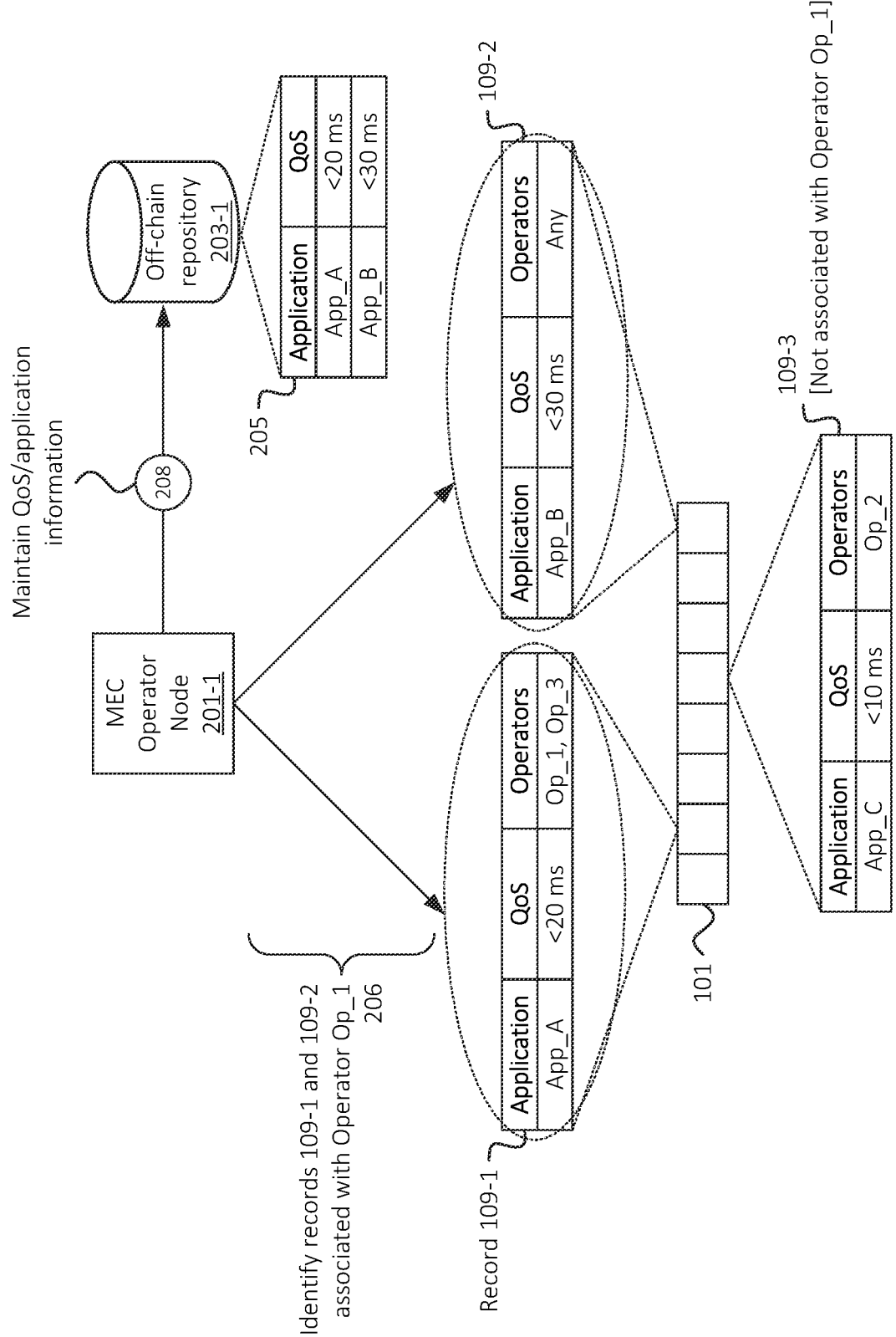
FIG. 2 illustrates an example of a particular entity identifying parameters, as recorded to a distributed ledger system, that are associated with the particular entity, in accordance with some embodiments.

In some embodiments, MEC operator systems may each be associated with one or more nodes, clients, and/or other entities that are authorized to access ledger 101, and/or that are authorized to access particular records recorded to ledger 101. For example, as shown in FIG. 2, MEC operator nodes 201 may access ledger 101 in order to determine particular QoS parameters associated with particular applications, in the event that such applications are to be provided via MECs associated with corresponding MEC operator systems. For example, as shown, MEC operator node 201-1, associated with a particular MEC operator system (e.g., MEC operator system Op_1), may identify (at 206) records 109-1 and 109-2, which include application and/or QoS information that is accessible to MEC operator node 201-1. For example, as discussed above, MEC operator node 201-1 may identify an identifier of MEC operator node 201-1 and/or a corresponding MEC operator system, as included in records 109-1 and 109-2. Additionally, or alternatively, MEC operator node 201-1 may use a private key to decrypt (or attempt to decrypt) one or more records of ledger 101, including record 109-1.

In this manner, while ledger 101 may maintain a record (e.g., record 109-3) associating App_A with a maximum latency of 30 ms for MEC operator system Op_2, such record may be inaccessible to MEC operator node 201-1 (e.g., which may be associated with a different MEC operator system and/or may otherwise not be associated with MEC operator system Op_2). Additionally, or alternatively, MEC operator node 201-1 may be able to access such a record, but may determine that the record does not include information based on which MEC operator node 201-1 performs subsequent operations discussed herein, and may therefore "ignore" such record.

MEC operator node 201-1 may maintain (at 208) QoS parameters, MEC management parameters, and/or other parameters associated with one or more MEC-deployable applications (e.g., as provided by respective application provider clients 103), and may store such information in off-chain repository 203-1 (e.g., in data structure 205 and/or one or more other suitable data structures). In some embodiments, respective MEC operator systems may implement the QoS parameters, MEC management parameters, and/or other parameters associated with a given application, such as in instances where one or more MECs associated with such MEC operator systems provide services associated with the given application to one or more UEs.

In some embodiments, prior to storing the information in off-chain repository 203-1, MEC operator node 201-1 may determine whether MEC operator node 201-1 is capable of satisfying the QoS parameters, MEC management parameters, etc. For example, MEC operator node 201-1 may monitor QoS metrics, resource utilization metrics, and/or other suitable metrics associated with MEC operator node 201-1 and may store the information associated with the one or more MEC-deployable applications when the monitored metrics exceed, satisfy, meet, etc. the QoS parameters, MEC management parameters, etc. indicated in the information. On the other hand, if MEC operator node 201-1 is not capable of satisfying the QoS parameters, MEC management parameters, etc., MEC operator node 201-1 may perform one or more other operations, such as indicating, to a respective application provide client 103, that MEC operator node 201-1 is not capable of satisfying such parameters. Additionally, or alternatively, MEC operator node 201-1 may record information to ledger 101, indicating that MEC operator node 201-1 is not capable of satisfying such QoS parameters, MEC management parameters, etc.

Figure 3:
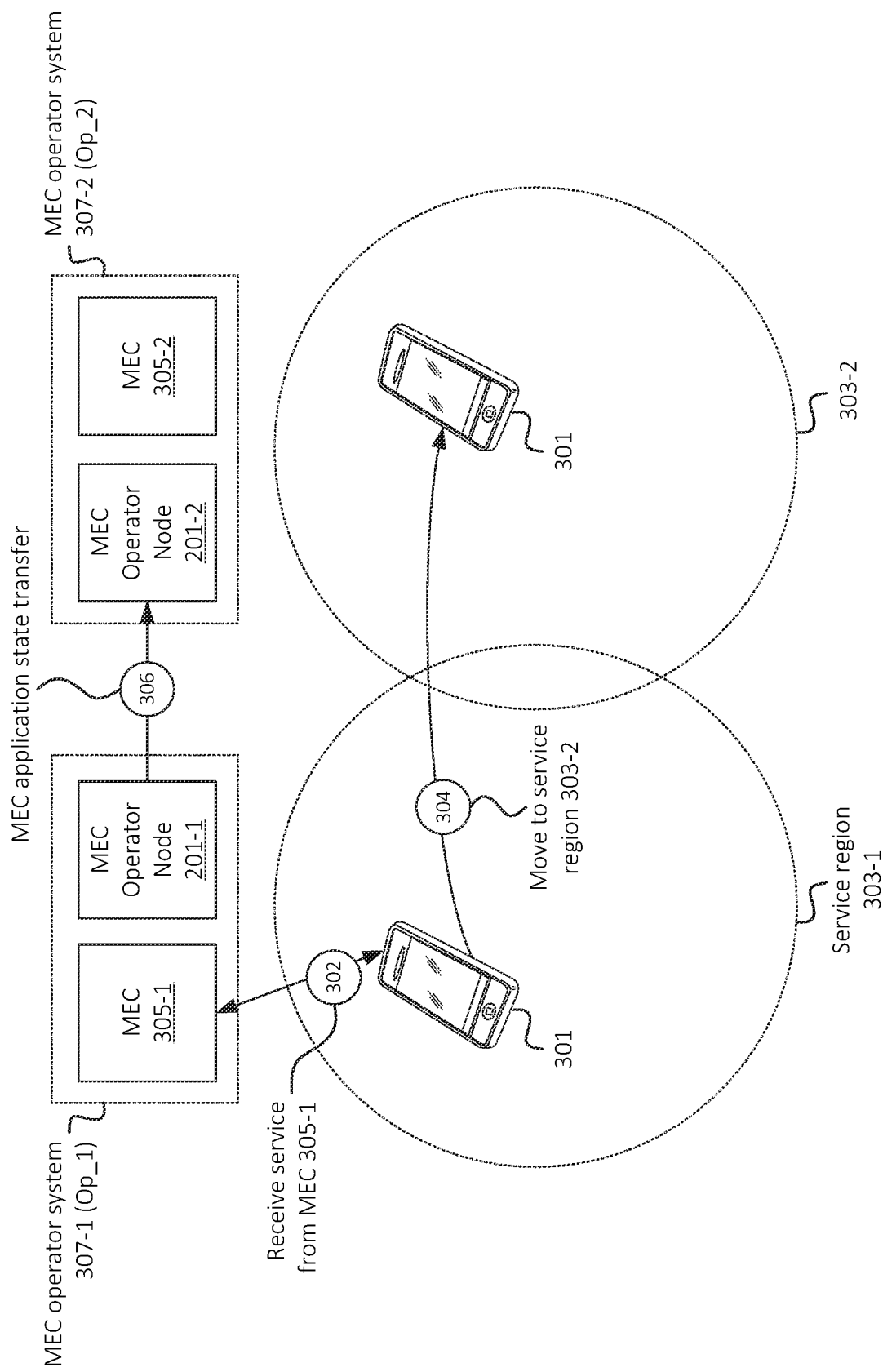
FIGS. 3 and 4 illustrate examples of modifying one or more off-chain systems based on parameters recorded to a distributed ledger system, in accordance with some embodiments.

As discussed below, the information stored in ledger 101 (e.g., as retrieved by one or more MEC operator nodes 201 and/or maintained in one or more associated off-chain repositories 203) may be used for inter-operator coordination of services and/or implementation of operator-specific parameters provided by one or more application provider clients 103. For example, as shown in FIG. 3, UE 301 may be located within service region 303-1, which may be a geographical region or other type of region that is served by a particular MEC, such as MEC 305. MEC 305 may, for example, be associated with a wireless network provider that provides wireless service to UEs 301 located within service region 303-1, and/or may otherwise provide services to UEs 301 located within service region 303-1. MEC 305 may be one MEC out of a set of MECs associated with a particular MEC operator system, such as MEC operator system 307-1. In this example, assume that MEC operator system 307-1 is referred to as "Op_1" in the figures. As such, MEC operator system 307-1 may also be associated with MEC operator node 201-1.

As UE 301 is located within service region 303-1, UE 301 may receive (at 302) service associated with a particular application from MEC 305-1. For example, UE 301 may receive traffic associated with the application as generated, processed, etc. by MEC 305-1. MEC 305-1 may have been configured by MEC operator system 307-1 based on QoS parameters, MEC management parameters, etc. as identified by MEC operator node 201-1 from ledger 101. As such, the services received (at 302) by UE 301 may be in accordance with QoS parameters specified by an application provider associated with the application.

At some point, UE 301 may move (at 304) to service region 303-2, which may be a service region associated with a different MEC operator system 307-2 (also referred to in the figures as "Op_2"). For example, service region 303-2 may be a geographically distinct region from service region 303-1, and UE 301 may be physically moved to service region 303-2 from service region 303-1. Additionally, or alternatively, service region 303-2 may partially or fully overlap service region 303-1, and UE 301 may be handed over, transferred, reassigned, etc. to MEC operator system 307-2 from MEC operator system 307-1 based on one or more criteria, conditions, policies, etc.

In some embodiments, MEC operator systems 307-1 and 307-2 may communicate via one or more application programming interfaces ("APIs") or other suitable communication pathways, to indicate the movement (at 304) of UE 301 from service region 303-1 to service region 303-2. In some embodiments, MEC operator system 307-1 may provide (at 306) a MEC application state, associated with UE 301, to MEC operator system 307-2 based on the moving of UE 301 to service region 303-2. The MEC application state may include information associated with providing service associated with the application to UE 301, such as a current application context or other status, cache, or other data associated with the application. In some embodiments, MEC operator node 201-1 may provide the application state to MEC operator node 201-2, and/or some other device or system associated with MEC operator system 307-1 may provide the application state to some other device or system associated with MEC operator system 307-2. In some embodiments, MEC operator node 201-2 may receive an indication that MEC operator system 307-2 (e.g., MEC 305-2) is responsible for providing the application to UE 301.

Figure 4:
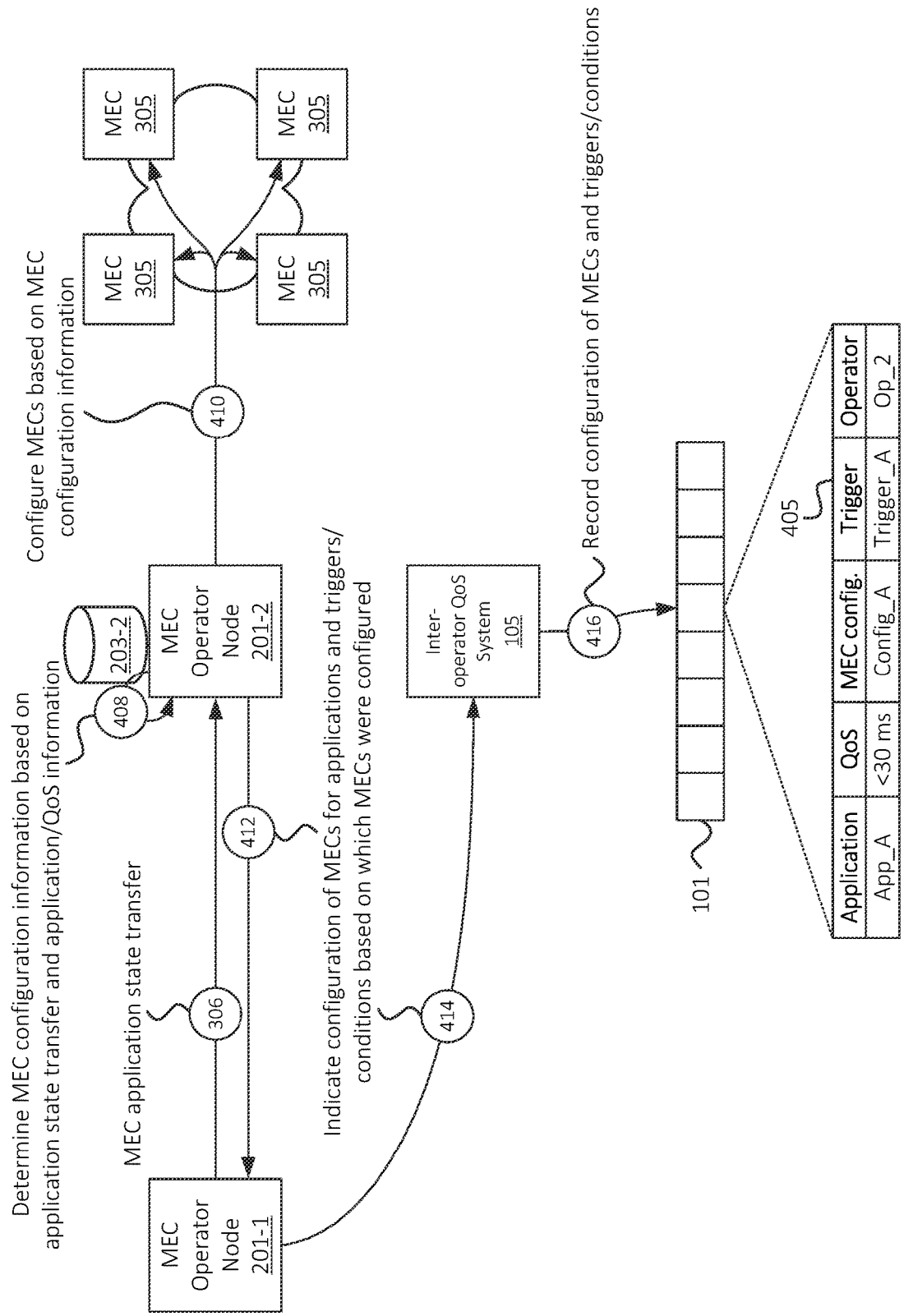

As shown in FIG. 4, based on receiving the indication that MEC operator system 307-2 is responsible for providing the application to UE 301, MEC operator node 201-2 and/or some other device or system associated with MEC operator system 307-2 may determine (at 408) MEC configuration information to provide the application in accordance with one or more QoS parameters, MEC management parameters, etc. as specified by an application provider associated with the application. For example, MEC operator node 201-2 and/or some other device or system of MEC operator system 307-2 may determine that resources of one or more MECs 305 (e.g., MEC 305-2) associated with MEC operator system 307-2 should be allocated to providing service associated with the application, that one or more installation packages or containers associated with the application should be installed, provisioned, activated, etc. at one or more MECs 305, and/or other suitable MEC configuration parameters.

In some embodiments, one or more devices or systems of MEC operator system 307-2 (e.g., other than MEC operator node 201-2) may determine such MEC configuration parameters, and may record the determined MEC configuration parameters to off-chain repository 203-2. In such embodiments, MEC operator node 201-2 may identify the MEC configuration parameters as recorded to off-chain repository 203-2. As further shown, MEC operator node 201-2 and/or one or more other devices or systems of MEC operator system 307-2 may configure one or more MECs 305, of MEC operator system 307-2, based on the determined MEC configuration information.

MEC operator node 201-2 may cause the implemented MEC configuration information, as well as the conditions, triggers, etc. for the implementation of the MEC configuration information, to be recorded to ledger 101. For example, MEC operator node 201-2 may indicate (at 412) the MEC configuration information (e.g., the allocation of resources at one or more MECs 305, the installation of one or more applications at one or more MECs 305, the scaling up of resources at one or more MECs 305 for one or more applications, the deallocation of resources at one or more MECs 305 for one or more applications, etc.) as implemented at MECs 305 associated with MEC operator system 307-2. MEC operator node 201-2 may further indicate (at 412) one or more triggers, conditions, etc. based on which MECs 305 were configured (at 410).

For example, MEC operator node 201-2 may indicate (at 412) that a particular application was installed at a particular MEC 305, and/or that resources associated with the particular MEC 305 were allocated for the particular application, based on the movement of one or more UEs 301 into service region 303-2, with which MEC operator node 201-2 is associated. As another example, MEC operator node 201-2 may indicate (at 412) that a particular amount of resources of a particular MEC 305 were allocated to a particular application based on a quantity of UEs 301, receiving service associated with the application from the particular MEC 305, exceeding a threshold quantity of UEs. MEC operator node 201-2 may further indicate one or more QoS parameters that MEC operator system 307-2 is meeting or is attempting to meet by way of configuring (e.g., at 410) one or more MECs 305.

In this manner, the provided (at 412) information may indicate what actions were taken by a given MEC operator system 307, as well as why such actions were taken (e.g., based on "off-chain" data relating to events, such as the movement of one or more UEs 301 into a service region associated with the given MEC operator system 307, the movement of one or more UEs 301 out of a service region associated with the given MEC operator system 307, and/or other suitable events). That is, while the movement of UE 301 from service region 303-1, associated with MEC operator system 307-1 to service region 303-2, associated with MEC operator system 307-2, is an example of a trigger based on which MEC operator system 307-1 and/or MEC operator system 307-2 may modify one or more MEC configurations (e.g., MEC operator system 307-1 may perform a lifecycle operation, MEC operator system 307-2 may perform a scale up operation, etc.), other events, conditions, or the like may be a trigger for the modification of a MEC configuration associated with a given MEC operator system 307.

In some embodiments, MEC operator node 201-2 may provide (at 412) the indication to MEC operator node 201-2, which may forward (at 414) some or all of the provided information to IQS 105. For example, MEC operator node 201-1 may verify some or all of the information (e.g., that the indicated operations were performed), prior to forwarding (at 414) the information to IQS 105. Additionally, or alternatively, in some embodiments, MEC operator node 201-2 may provide the indication to IQS 105.

IQS 105 may record (at 416) some or all of the provided (at 414) information to ledger 101. As such, ledger 101 may include a set of records, such as example record 405, indicating that a particular MEC operator system 307 configured one or more MECs 305 based on a particular trigger, in order to provide a particular set of QoS parameters for a particular application. Record 405, for example, may indicate that MEC operator system 307-2 configured one or more MECs 305 according to a particular set of configuration parameters, represented as "Config_A." The MEC configuration parameters (e.g., as represented by "Config_A" in the figure) may include, for example, MEC resource allocations and/or other suitable configuration parameters selected or determined by MEC operator system 307-2 based on particular QoS parameters (e.g., QoS parameters specifying a maximum of 30 ms latency for App_A).

The trigger(s) for implementing the particular MEC configuration parameters (represented as "Trigger A") may include an indication of the MEC application state transfer (at 306) and/or one or more other conditions, parameters, etc. based on which the MEC configuration parameters were implemented. As another example, the triggers for implementing a given set of MEC configuration parameters may include an indication that a quantity of UEs accessing a particular application from a particular MEC 305 exceed a threshold quantity of UEs. As yet another example, the triggers for implementing a given set of MEC configuration parameters may include an indication that a predictive model provided an indication that the MEC configuration parameters should be implemented in order to achieve a given set of QoS parameters (e.g., as specified by application provider client 103 associated with the particular application). In some embodiments, the triggers for implementing a given set of MEC configuration parameters may include a "snapshot" of information or parameters associated with a given MEC operator system 307, such as a quantity of UEs 301 located within one or more service regions 303 associated with MEC operator system 307, MEC configuration parameters associated with one or more MECs 305 of MEC operator system 307, and/or other suitable information.

In this manner, multiple MEC operator systems 307 may provide information regarding the configuration of associated MECs 305 to provide one or more applications according to QoS parameters, MEC management parameters, or other parameters specified by application provider clients 103 or other suitable entities. For example, as noted above, a particular application provider client 103 may be able to specify QoS parameters, MEC management parameters, etc. on a per-operator basis, such that different MEC operator systems 307 are associated with different QoS parameters, MEC management parameters, etc. by recording such parameters to ledger 101 (e.g., via IQS 105, interacting directly with ledger 101, and/or otherwise causing such parameters to be recorded to ledger 101), and respective MEC operator systems 307 may be able to access and implement such parameters.

Figure 5:
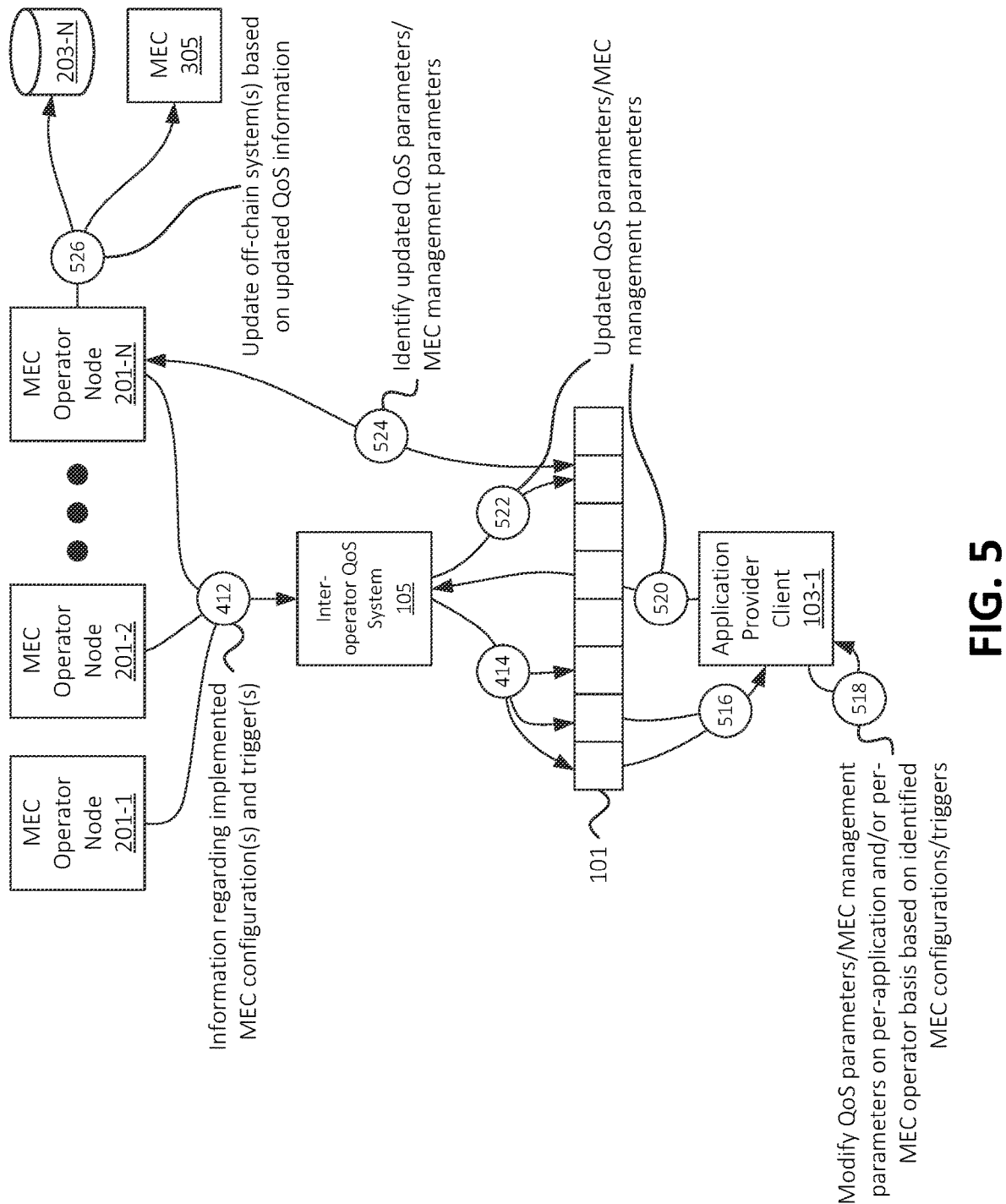
FIG. 5 illustrates an example of operations that may be performed iteratively in order to update configuration parameters based on triggers on an ongoing basis, in accordance with some embodiments.

As shown in FIG. 5, for example, assume that MEC operator nodes 201-1 through MEC operator nodes 201-N (e.g., associated with example MEC operator systems 307-1 through 307-N) provide (at 412) information regarding implemented MEC configurations and/or triggers for such configurations, as similarly discussed above with respect to FIG. 4. As also discussed above with respect to FIG. 4, IQS 105 may record (at 414) the received information to ledger 101, thus creating records that may be accessible by one or more application provider clients 103 with which such records are associated.

For example, application provider client 103-1 may identify (at 516) multiple records of ledger 101 that are associated with application provider client 103-1 (e.g., associated with a particular application provided by an application provider associated with application provider client 103-1). The multiple records may indicate different MEC configuration parameters implemented by different MEC operator systems 307 based on one or more respective triggers, conditions, etc. In this manner, application provider client 103-1 may be able to perform analytics based on a relationship or correlation of particular configuration parameters to particular triggers, train one or more models that associate particular configuration parameters to particular triggers, and/or perform other suitable operations.

In some embodiments, application provider client 103-1 may modify (at 518) QoS parameters associated with a particular application based on the identified (at 516) MEC configuration parameters, triggers, etc. For example, application provider client 103-1 may identify that a particular MEC operator system 307 is frequently changing MEC configuration parameters for a particular application, and may accordingly modify QoS parameters, associated with the application, for that particular MEC operator system 307 (e.g., may increase or reduce particular QoS thresholds). Additionally, or alternatively, application provider client 103-1 may modify MEC management parameters, associated with the application, for the particular MEC operator system 307, such as by increasing an interval associated with a lifecycle operation (e.g., may indicate that MEC operator system 307 should introduce an additional delay before beginning to deallocate MEC resources associated with providing the application) or performing other suitable operations. While examples of modifying QoS parameters and/or MEC management parameters are provided above, in practice, such modifications may include other suitable modifications to QoS parameters, MEC management parameters, and/or other parameters on a per-MEC operator basis or some other suitable basis.

Application provider client 103-1 may further cause the updated QoS parameters, MEC management parameters, etc. to be recorded to ledger 101. For example, application provider client 103-1 may provide (at 520) the updated parameters to IQS 105, which may record (at 522) the updated parameters to one or more records of ledger 101. Additionally, or alternatively, application provider client 103-1 may directly record the updated parameters to ledger 101 (e.g., in embodiments where application provider client 103-1 has access to write to ledger 101), and/or may otherwise cause such parameters to be recorded to ledger 101.

In this example, assume that the updated parameters include updated parameters for MEC operator system 307-N. MEC operator node 201-N may accordingly identify (at 524) the updated parameters for MEC operator system 307-N as recorded to ledger 101. For example, MEC operator node 201-N, a block explorer, a listener engine, and/or some other suitable device or system may identify the recordation (at 522) of the updated parameters for MEC operator system 307-N. MEC operator node 201-N may accordingly provide (at 526) the updated parameters to one or more off-chain systems associated with MEC operator system 307-N, such as to off-chain repository 203-N (with which MEC operator system 307-N is associated), and/or to one or more devices or systems of MEC operator system 307 that configures one or more MECs 305 based on the updated QoS parameters, MEC management parameters, etc. In this manner, multiple MEC operator systems 307 may be able to provide ongoing updates to MEC configuration parameters implemented in response to particular triggers (e.g., as detected off-chain), QoS and/or MEC management parameters (e.g., as provided on-chain), etc., and may further be able to receive and implement updated MEC configuration parameters based on updated QoS information as provided by application provider clients 103. By using distributed ledger techniques, application provider clients 103 and MEC operator nodes 201 may be able to indirectly communicate without needing to separately establish or maintain respective communication channels, thereby reducing the complexity of coordinating between multiple different MEC operator systems 307 and/or application providers.

For example, once a given MEC operator system 307 updates off-chain systems based on updated QoS parameters (e.g., as provided (at 518) by one or more application provider clients 103), a respective MEC operator node 201 associated with MEC operator system 307 may cause (e.g., at 412 and/or 414) updated MEC configuration parameters to be recorded to ledger 101, where the trigger for such update may be or may include the updated QoS parameters, MEC management parameters, etc. In this manner, some or all of the operations shown in FIGS. 4 and 5 may repeat iteratively and/or on ongoing basis, thus allowing for application provider client 103 to continue to refine parameters associated with given applications and/or MEC operator systems 307 and optimize such parameters in order to achieve one or more measures of yield, optimization goals, etc. (e.g., minimal modification of MEC configuration parameters, minimal usage of MEC resources, etc.).

Figure 6:
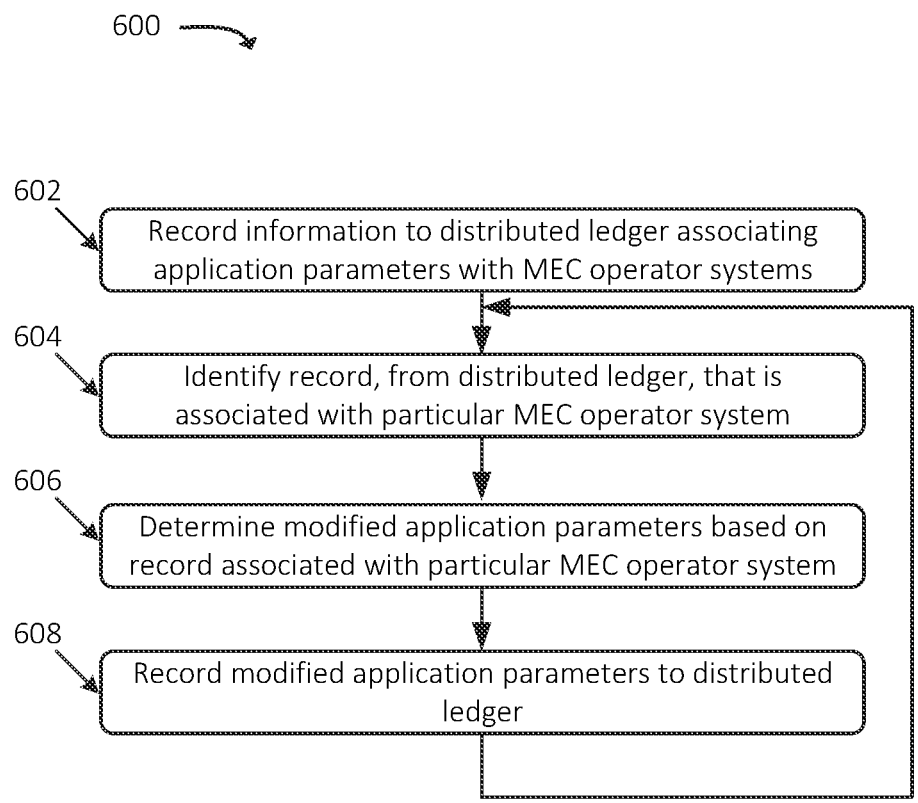
FIG. 6 illustrates an example process for using a distributed ledger system to provide updated application parameters to one or more operator systems based on information, associated with such operator systems, recorded to the distributed ledger system, in accordance with some embodiments.

FIG. 6 illustrates an example process 600 for using a distributed ledger system to provide updated application parameters to one or more operator systems based on information, associated with such operator systems, recorded to the distributed ledger system. In some embodiments, some or all of process 600 may be performed by IQS 105. In some embodiments, one or more other devices may perform some or all of process 600 in concert with, and/or in lieu of, IQS 105 (e.g., application provider client 103, MEC operator node 201, and/or one or more other devices or systems).

As shown, process 600 may include recording (at 602) information to a distributed ledger, associating application parameters with one or more MEC operator systems. For example, as discussed above, IQS 105 may record QoS parameters, MEC management parameters, and/or one or more other parameters associated with one or more particular applications to ledger 101. Such parameters may be received from one or more application provider clients 103 (e.g., which may be associated with particular applications or application providers) or some other suitable source. The application parameters may be provided on a per-MEC operator system basis, such that different MEC operator systems 307 may be associated with different QoS parameters, MEC management parameters, etc. for the same application. For example, such records may include an identifier of a respective MEC operator system 307, may be encrypted using a public key associated with a respective MEC operator system 307 (e.g., for which MEC operator system 307 maintains a private key), may be written to ledger 101 with a permission indicating that a respective MEC operator system 307 is authorized to access the record, and/or may otherwise be associated with one or more MEC operator systems 307.

Process 600 may further include identifying (at 604), from the distributed ledger, a record that is associated with a particular MEC operator system. For example, IQS 105, a particular MEC operator node 201, or other device or system may identify a record that is associated with a particular MEC operator system 307. The record may include, for example, an indication of MEC configuration parameters that were implemented by the particular MEC operator system 307, such as an indication of resources allocated to or deallocated from providing service associated with the particular application. In some embodiments, the record may include one or more triggers, based on which MEC operator system 307 implemented the MEC configuration parameters.

Such triggers may include or may be associated with "on-chain" information, such as QoS parameters, MEC management parameters, or other parameters that are associated with one or more applications provided via one or more MECs 305 associated with the particular MEC operator system 307. Additionally, or alternatively, such triggers may include or may be associated with "off-chain" information, such as the transfer of one or more UEs 301 to MECs 305 associated with the particular MEC operator system 307, the actual or predicted (e.g., based on one or more AI/ML models or other types of models) demand for a particular application via one or more MECs 305 associated with the particular MEC operator system 307, and/or one or more other suitable triggers, conditions, events, etc.

Process 600 may additionally include determining (at 606) modified application parameters based on the record associated with the particular MEC operator system. For example, IQS 105, application provider client 103 (e.g., associated with the particular application), and/or some other device or system may utilize AI/ML techniques, modeling techniques, and/or other suitable techniques in order to refine, update, or otherwise modify the application parameters (e.g., QoS parameters, MEC management parameters, etc.) associated with the particular application based on the association between the MEC configuration parameters and the triggers (e.g., the on-chain and/or off-chain triggers, events, etc.).

Process 600 may also include recording (at 608) the modified application parameters to the distributed ledger. For example, IQS 105, application provider client 103, and/or some other device or system may record the modified application parameters to ledger 101. The modified application parameters may be recorded in a manner similar to that described above with respect to operation 602. For example, the modified application parameters may include modified QoS parameters, modified MEC management parameters, etc. that are associated with the particular MEC operator system 307. In this manner, the particular MEC operator system 307 may be able to implement updated MEC configuration parameters if necessary (e.g., in the event that the modified application parameters are a trigger for updating the MEC configuration parameters). When updating MEC configuration parameters (e.g., in response to the modified application parameters and/or based on one or more subsequent off-chain events), MEC operator system 307 may cause one or more records to be written to ledger 101, indicating the modified application parameters and the trigger(s) based on which the modified application parameters were implemented.

In this manner, some or all of process 600 (e.g., operations 604-608) may be repeated in an iterative manner with respect to one or multiple MEC operator systems 307, thus allowing a single application provider client 103 to coordinate and fine-tune application parameters for the same application as provided via MECs 305 of multiple different MEC operator systems 307, without necessitating application provider client 103 to establish or maintain separate communication pathways with the multiple MEC operator systems 307. Similarly, the same MEC operator system 307 may be able to receive application parameters associated with multiple applications (e.g., as provided by different application providers) and may be able to communicate MEC configurations or MEC configuration changes associated with the multiple applications without necessitating MEC operator system 307 to establish or maintain separate communication pathways with the multiple application providers. Further, the use of distributed ledger techniques may maintain the security of MEC operator systems 307 and/or the application providers, by restricting read and/or write access from unauthorized entities.

Figure 7:
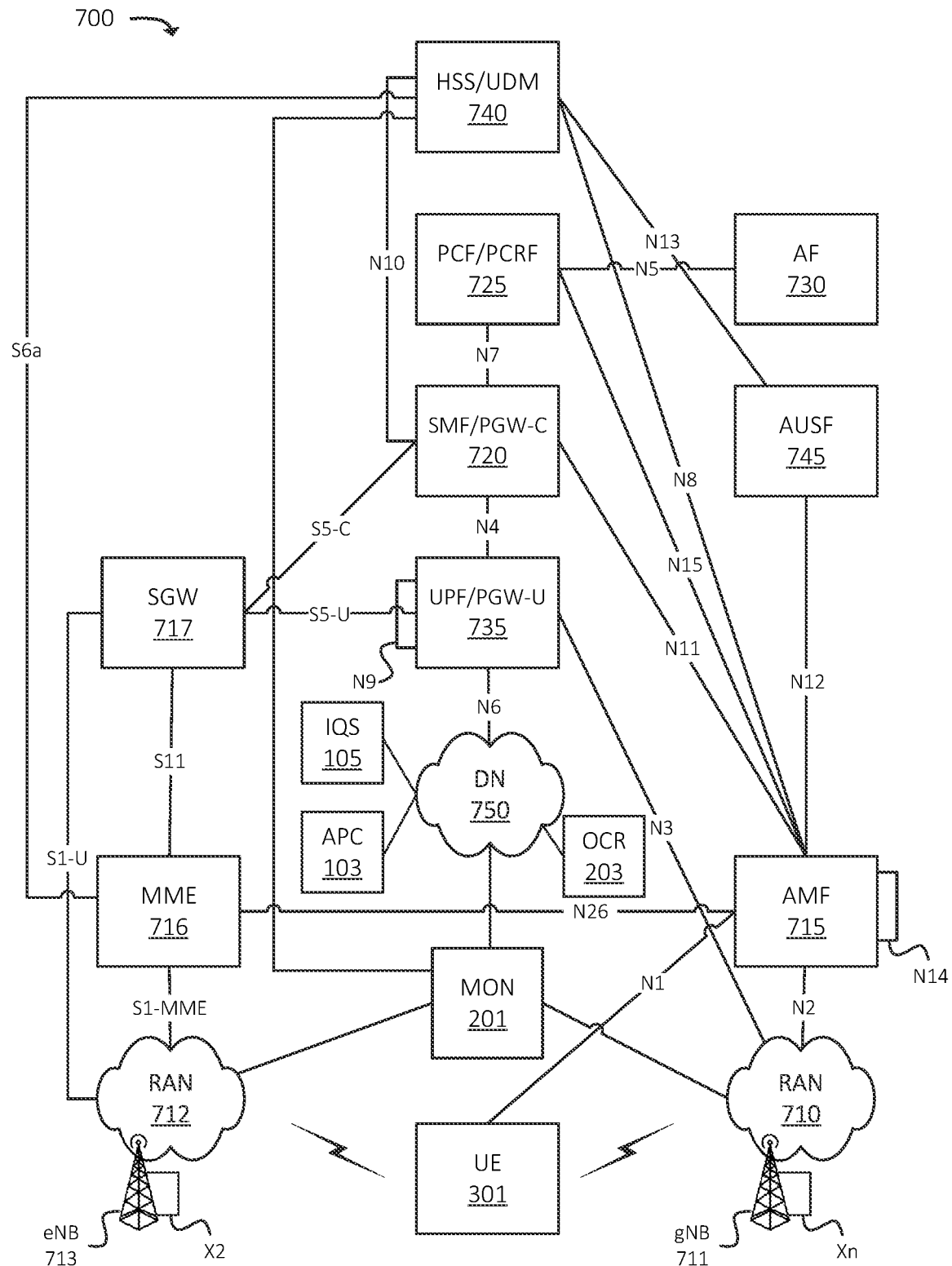
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include UE 301, RAN 710 (which may include one or more Next Generation Node Bs ("gNBs") 711), RAN 712 (which may include one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as application provider client 103, IQS 105, MEC operator node 201, off-chain repository 203, and/or one or more other devices or systems.

The example shown in FIG. 7 illustrates one instance of each network component or function (e.g., one instance of SMF/PGW-C 720, PCF/PCRF 725, UPF/PGW-U 735, HSS/UDM 740, and/or AUSF 745). In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or AUSF 745, while another slice may include a second instance of SMF/PGW-C 720, PCF/PCRF 725, UPF/PGW-U 735, HSS/UDM 740, and/or AUSF 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 301 may include a computation and communication device, such as a wireless mobile communication device that is capable of communicating with RAN 710, RAN 712, and/or DN 750. UE 301 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 301 may send traffic to and/or receive traffic (e.g., user plane traffic) from DN 750 via RAN 710, RAN 712, and/or UPF/PGW-U 735. In some embodiments, UE 301 may implement one or more nodes, validators, etc. that maintain, manage, or access ledger 101. In some embodiments, UE 301 may implement and/or may be otherwise associated with one or more instances of application provider client 103, IQS 105, and/or MEC operator node 201.

RAN 710 may be, or may include, a 5G RAN that includes one or more base stations (e.g., one or more gNBs 711), via which UE 301 may communicate with one or more other elements of environment 700. UE 301 may communicate with RAN 710 via an air interface (e.g., as provided by gNB 711). For instance, RAN 710 may receive traffic (e.g., voice call traffic, data traffic, messaging traffic, signaling traffic, etc.) from UE 301 via the air interface, and may communicate the traffic to UPF/PGW-U 735, and/or one or more other devices or networks. Similarly, RAN 710 may receive traffic intended for UE 301 (e.g., from UPF/PGW-U 735, AMF 715, and/or one or more other devices or networks) and may communicate the traffic to UE 301 via the air interface.

RAN 712 may be, or may include, a LTE RAN that includes one or more base stations (e.g., one or more eNBs 713), via which UE 301 may communicate with one or more other elements of environment 700. UE 301 may communicate with RAN 712 via an air interface (e.g., as provided by eNB 713). For instance, RAN 710 may receive traffic (e.g., voice call traffic, data traffic, messaging traffic, signaling traffic, etc.) from UE 301 via the air interface, and may communicate the traffic to UPF/PGW-U 735, and/or one or more other devices or networks. Similarly, RAN 710 may receive traffic intended for UE 301 (e.g., from UPF/PGW-U 735, SGW 717, and/or one or more other devices or networks) and may communicate the traffic to UE 301 via the air interface.

AMF 715 may include one or more devices, systems, Virtualized Network Functions ("VNFs"), Cloud-Native Network Functions ("CNFs"), etc., that perform operations to register UE 301 with the 5G network, to establish bearer channels associated with a session with UE 301, to hand off UE 301 from the 5G network to another network, to hand off UE 301 from the other network to the 5G network, manage mobility of UE 301 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 301 with the EPC, to establish bearer channels associated with a session with UE 301, to hand off UE 301 from the EPC to another network, to hand off UE 301 from another network to the EPC, manage mobility of UE 301 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 301. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 301, from DN 750, and may forward the user plane data toward UE 301 (e.g., via RAN 710, SMF/PGW-C 720, and/or one or more other devices). In some embodiments, multiple UPFs 735 may be deployed (e.g., in different geographical locations), and the delivery of content to UE 301 may be coordinated via the N9 interface (e.g., as denoted in FIG. 7 by the line marked "N9" originating and terminating at UPF/PGW-U 735). Similarly, UPF/PGW-U 735 may receive traffic from UE 301 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, CNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 301.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 301 may communicate, through DN 750, with data servers, other UEs 301, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 301 may communicate.

Figure 8:
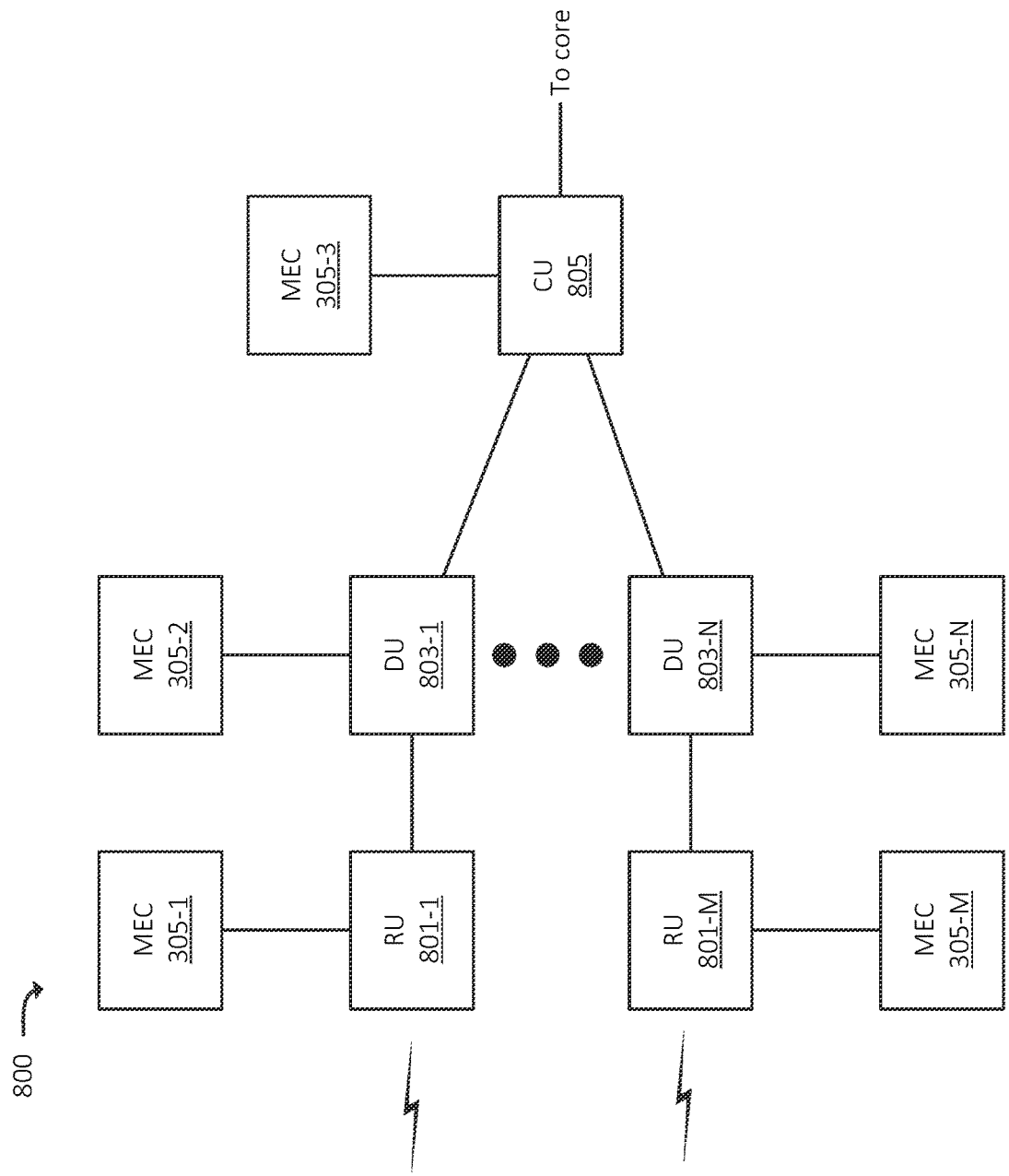
FIG. 8 illustrates an example arrangement of a radio access network ("RAN"), in accordance with some embodiments.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, a first MEC operator system 307 may include or may be communicatively coupled to a first DU network 800 or set of DU networks 800, and a second MEC operator system 307 may include or may be communicatively coupled to a second DU network 800 or set of DU networks 800.

In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 301 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 301, and may determine which DU(s) 803 should receive the downlink traffic. DU 803 may include one or more devices that transmit traffic between a core network (e.g., via CU 805) and UE 301 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 301.

RU 801 may include hardware circuitry (e.g., one or more RF transceivers, antennas, radios, and/or other suitable hardware) to communicate wirelessly (e.g., via an RF interface) with one or more UEs 301, one or more other DUs 803 (e.g., via RUs 801 associated with DUs 803), and/or any other suitable type of device. In the uplink direction, RU 801 may receive traffic from UE 301 and/or another DU 803 via the RF interface and may provide the traffic to DU 803. In the downlink direction, RU 801 may receive traffic from DU 803, and may provide the traffic to UE 301 and/or another DU 803.

RUs 801 may, in some embodiments, be communicatively coupled to one or more Multi-Access/Mobile Edge Computing ("MEC") devices, referred to sometimes herein simply as "MECs" 305. For example, RU 801-1 may be communicatively coupled to MEC 305-1, RU 801-M may be communicatively coupled to MEC 305-M, DU 803-1 may be communicatively coupled to MEC 305-2, DU 803-N may be communicatively coupled to MEC 305-N, CU 805 may be communicatively coupled to MEC 305-3, and so on. MECs 305 may include hardware resources (e.g., configurable or provisionable hardware resources) that may be configured to provide services and/or otherwise process traffic to and/or from UE 301, via a respective RU 801.

For example, RU 801-1 may route some traffic, from UE 301, to MEC 305-1 instead of to a core network (e.g., via DU 803 and CU 805). MEC 305-1 may process the traffic, perform one or more computations based on the received traffic, and may provide traffic to UE 301 via RU 801-1. In this manner, ultra-low latency services may be provided to UE 301, as traffic does not need to traverse DU 803, CU 805, and an intervening backhaul network between DU network 800 and the core network. In some embodiments, MEC 305 may include, and/or may implement, some or all of the functionality described above with respect to UPF 735 and/or one or more other devices, systems, VNFs, CNFs, etc.

Figure 9:
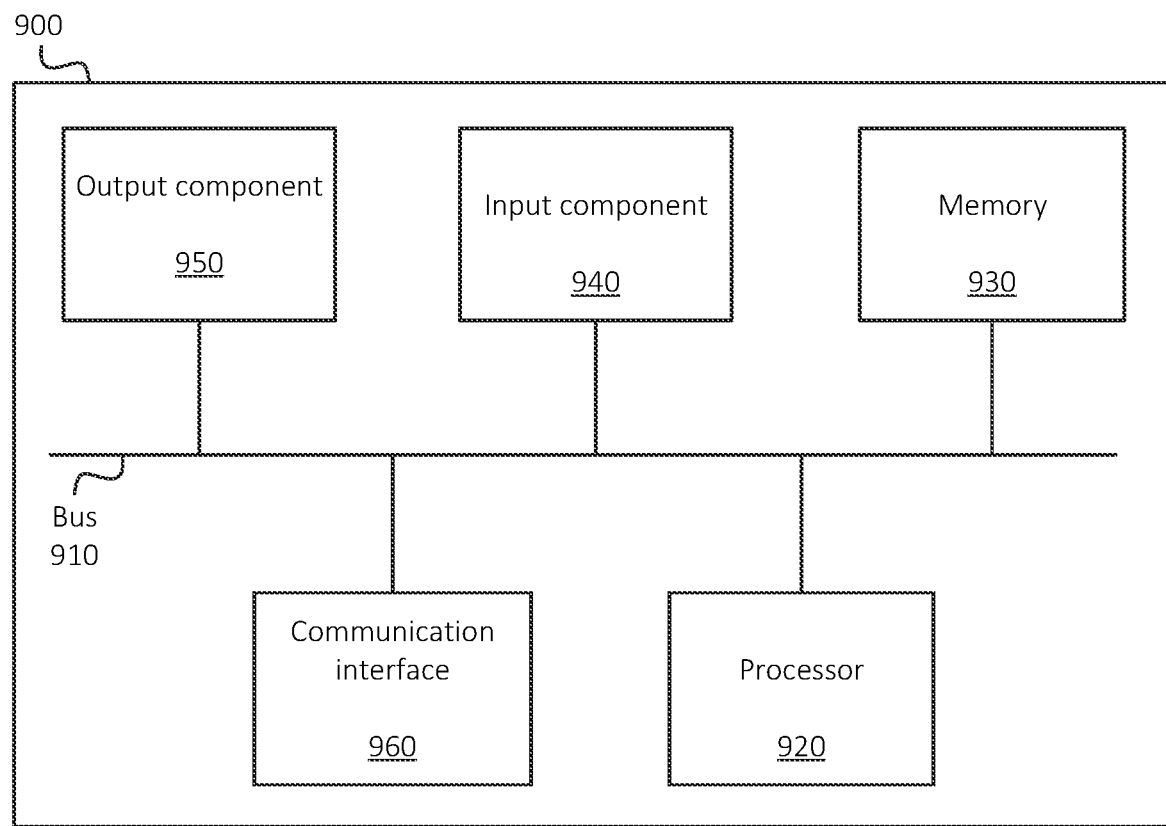
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth© radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   identify a set of application Quality of Service ("QoS") parameters associated with an application that is installed at one or more Multi-Access/Mobile Edge Computing ("MEC") devices associated with a particular MEC operator system;
   identify a first record, from a distributed ledger, that is associated with the particular MEC operator system, wherein the first record indicates:
   a first set of MEC configuration parameters implemented by the particular MEC device operator system to configure the one or more MEC devices on which the particular application is installed, and
   one or more triggers based on which the first set of MEC configuration parameters were implemented by the particular MEC device operator system;
   generate a set of modified application QoS parameters based on:
   the set of application QoS parameters,
   the first set of MEC configuration parameters indicated in the first record of the distributed ledger, and
   the one or more triggers indicated in the first record of the distributed ledger; and
   record a second record to the distributed ledger, wherein the second record includes the set of modified application QoS parameters, wherein the particular MEC operator system identifies the second record based on accessing the distributed ledger, and implements a second set of MEC configuration parameters based on the modified application QoS parameters included in the second record.

2. The device of claim 1, wherein the particular MEC operator system is a first MEC operator system, wherein the set of modified application parameters are a first set of modified application QoS parameters, wherein the one or more processors are further configured to:
   identify a third record, from the distributed ledger, that is associated with a second MEC operator system; and
   record a second set of modified application QoS parameters, associated with the second MEC operator system, to the distributed ledger,
   wherein the second MEC operator system implements a third set of MEC configuration parameters based on the second set of modified application QoS parameters included in the third record.

3. The device of claim 2, wherein the first set of modified application parameters are recorded to the distributed ledger with an indication that the first set of modified application parameters are associated with the first MEC operator system, and wherein the second set of modified application parameters are recorded to the distributed ledger with an indication that the second set of modified application parameters are associated with the second MEC operator system.

4. The device of claim 1, wherein the one or more triggers based on which the first set of MEC configuration parameters were implemented by the particular MEC operator system include an indication of QoS thresholds associated with the particular application installed at the one or more MEC devices associated with the particular MEC operator system.

5. The device of claim 1, wherein the one or more triggers based on which the first set of MEC configuration parameters were implemented by the particular MEC operator system include an indication that at least a threshold quantity of User Equipment ("UE") devices receive service, associated with the particular application installed at the one or more MEC devices associated with the particular MEC operator system.

6. The device of claim 1, wherein the modified application parameters further include MEC management parameters associated with the one or more MEC devices of the particular MEC operator system.

7. The device of claim 6, wherein the MEC management parameters include at least one of:
MEC scale up parameters, or
MEC lifecycle parameters.

8. A non-transitory computer-readable medium, storing a plurality of processor-executable instructions to:
identify a set of application Quality of Service ("QoS") parameters associated with an application that is installed at one or more Multi-Access/Mobile Edge Computing ("MEC") devices associated with a particular MEC operator system;
identify a first record, from a distributed ledger, that is associated with the particular MEC operator system, wherein the first record indicates:
a first set of MEC configuration parameters implemented by the particular MEC device operator system to configure the one or more MEC devices on which the particular application is installed, and
one or more triggers based on which the first set of MEC configuration parameters were implemented by the particular MEC device operator system;
generate a set of modified application QoS parameters based on:
the set of application QoS parameters,
the first set of MEC configuration parameters indicated in the first record of the distributed ledger, and
the one or more triggers indicated in the first record of the distributed ledger; and
record a second record to the distributed ledger, wherein the second record includes the set of modified application QoS parameters, wherein the particular MEC operator system identifies the second record based on accessing the distributed ledger, and implements a second set of MEC configuration parameters based on the modified application QoS parameters included in the second record.

9. The non-transitory computer-readable medium of claim 8, wherein the particular MEC operator system is a first MEC operator system, wherein the set of modified application parameters are a first set of modified application QoS parameters, wherein the plurality of processor-executable instructions further include processor-executable instructions to:
identify a third record, from the distributed ledger, that is associated with a second MEC operator system; and
record a second set of modified application QoS parameters, associated with the second MEC operator system, to the distributed ledger,
wherein the second MEC operator system implements a third set of MEC configuration parameters based on the second set of modified application QoS parameters included in the third record.

10. The non-transitory computer-readable medium of claim 9, wherein the first set of modified application parameters are recorded to the distributed ledger with an indication that the first set of modified application parameters are associated with the first MEC operator system, and wherein the second set of modified application parameters are recorded to the distributed ledger with an indication that the second set of modified application parameters are associated with the second MEC operator system.

11. The non-transitory computer-readable medium of claim 8, wherein the one or more triggers based on which the first set of MEC configuration parameters were implemented by the particular MEC operator system include an indication of QoS thresholds associated with the particular application installed at the one or more MEC devices associated with the particular MEC operator system.

12. The non-transitory computer-readable medium of claim 8, wherein the one or more triggers based on which the first set of MEC configuration parameters were implemented by the particular MEC operator system include an indication that at least a threshold quantity of User Equipment ("UE") devices receive service, associated with the particular application installed at the one or more MEC devices associated with the particular MEC operator system.

13. The non-transitory computer-readable medium of claim 8, wherein the modified application parameters further include MEC management parameters associated with the one or more MEC devices of the particular MEC operator system.

14. The non-transitory computer-readable medium of claim 13, wherein the MEC management parameters include at least one of:
MEC scale up parameters, or
MEC lifecycle parameters.

15. A method, comprising:
identifying a set of application Quality of Service ("QoS") parameters associated with an application that is installed at one or more Multi-Access/Mobile Edge Computing ("MEC") devices associated with a particular MEC operator system;
identifying a first record, from a distributed ledger, that is associated with the particular MEC operator system, wherein the first record indicates:
a first set of MEC configuration parameters implemented by the particular MEC device operator system to configure the one or more MEC devices on which the particular application is installed, and
one or more triggers based on which the first set of MEC configuration parameters were implemented by the particular MEC device operator system;
generating a set of modified application QoS parameters based on:
the set of application QoS parameters, the first set of MEC configuration parameters indicated in the first record of the distributed ledger, and the one or more triggers indicated in the first record of the distributed ledger; and recording a second record to the distributed ledger, wherein the second record includes the set of modified application QoS parameters, wherein the particular MEC operator system identifies the second record based on accessing the distributed ledger, and implements a second set of MEC configuration parameters based on the modified application QoS parameters included in the second record.

16. The method of claim 15, wherein the particular MEC operator system is a first MEC operator system, wherein the set of modified application parameters are a first set of modified application QoS parameters, the method further comprising:

identifying a third record, from the distributed ledger, that is associated with a second MEC operator system; and recording a second set of modified application QoS parameters, associated with the second MEC operator system, to the distributed ledger, wherein the second MEC operator system implements a third set of MEC configuration parameters based on the second set of modified application QoS parameters included in the third record.

17. The method of claim 16, wherein the first set of modified application parameters are recorded to the distributed ledger with an indication that the first set of modified application parameters are associated with the first MEC operator system, and wherein the second set of modified application parameters are recorded to the distributed ledger with an indication that the second set of modified application parameters are associated with the second MEC operator system.

18. The method of claim 15, wherein the one or more triggers based on which the first set of MEC configuration parameters were implemented by the particular MEC operator system include an indication of QoS thresholds associated with the particular application installed at the one or more MEC devices associated with the particular MEC operator system.

19. The method of claim 15, wherein the one or more triggers based on which the first set of MEC configuration parameters were implemented by the particular MEC operator system include an indication that at least a threshold quantity of User Equipment ("UE") devices receive service, associated with the particular application installed at the one or more MEC devices associated with the particular MEC operator system.

20. The method of claim 15, wherein the modified application parameters include MEC management parameters associated with the one or more MEC devices of the particular MEC operator system, wherein the MEC management parameters include at least one of:

MEC scale up parameters, or

MEC lifecycle parameters.

* * * * *